US012360929B2

(12) United States Patent
Liu

(10) Patent No.: US 12,360,929 B2
(45) Date of Patent: Jul. 15, 2025

(54) MEMORY MANAGEMENT DEVICE AND METHOD APPLIED TO INTELLIGENCE PROCESSING UNIT

(71) Applicant: SigmaStar Technology Ltd., Fujian (CN)

(72) Inventor: Jian Liu, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 131 days.

(21) Appl. No.: 18/505,362

(22) Filed: Nov. 9, 2023

(65) Prior Publication Data

US 2024/0273043 A1 Aug. 15, 2024

(30) Foreign Application Priority Data

Feb. 14, 2023 (CN) .......................... 202310116238.X

(51) Int. Cl.
*G06F 13/28* (2006.01)
*G06F 9/50* (2006.01)
*G06F 12/02* (2006.01)

(52) U.S. Cl.
CPC .................................. *G06F 13/28* (2013.01)

(58) Field of Classification Search
CPC ...................................................... G06F 13/28
USPC ............................................................. 710/22
See application file for complete search history.

(56) References Cited

U.S. PATENT DOCUMENTS

| 7,249,241 | B1 * | 7/2007 | Chu ..................... | G06F 12/1081 |
| | | | | 711/6 |
| 8,984,179 | B1 * | 3/2015 | Cardona ................. | G06F 13/28 |
| | | | | 710/1 |
| 11,960,402 | B2 * | 4/2024 | Liu .......................... | G06N 3/08 |
| 2015/0169231 | A1 * | 6/2015 | Kanigicherla ........ | G06F 3/0611 |
| | | | | 710/5 |
| 2019/0235755 | A1 * | 8/2019 | Abe ....................... | G06F 3/0683 |
| 2021/0157737 | A1 * | 5/2021 | Gu ......................... | G06F 9/3877 |
| 2023/0105277 | A1 * | 4/2023 | Uhrenholt ............. | G06F 9/5016 |
| | | | | 711/154 |

* cited by examiner

*Primary Examiner* — Chun Kuan Lee
(74) *Attorney, Agent, or Firm* — Edell, Shapiro & Finnan, LLC

(57) ABSTRACT

A memory management device includes a pre-fetch circuit, a setting circuit and a mapping circuit. The pre-fetch circuit acquires original data via a direct memory access (DMA) circuit, wherein the original data indicates a mapping relation between a first virtual address and multiple physical addresses. The setting circuit analyzes the original data to sequentially map the physical addresses to multiple second virtual addresses including the first virtual address and issues a write request. The mapping circuit stores a mapping relation between the physical addresses and the second virtual addresses as a first mapping table according the write request, and utilizes the first mapping table according to at least one read request corresponding to at least one channel of the DMA circuit to access the memory.

12 Claims, 6 Drawing Sheets

| OD | | | | | | | | | | | | | | | | | | | | | | |
|---|---|---|---|---|---|---|---|---|---|---|---|---|---|---|---|---|---|---|---|---|---|---|
| PA5 | PA4 | PA3 | PA2 | PA1 | PA0 | VA | LEN=26 | PA3 | PA2 | PA1 | PA0 | VA | LEN=4 | Tag | TL=32 |
| PA21 | PA20 | PA19 | PA18 | PA17 | PA16 | PA15 | PA14 | PA13 | PA12 | PA11 | PA10 | PA9 | PA8 | PA7 | PA6 |
| TL=0 | TL=0 | TL=0 | TL=0 | TL=0 | TL=0 | PA0 | VA | LEN=1 | PA0 | VA | LEN=1 | PA25 | PA24 | PA23 | PA22 |
| PA3 | PA2 | PA1 | PA0 | VA | LEN=5 | Tag | TL=13 | PA3 | PA2 | PA1 | PA0 | VA | LEN=4 | Tag | TL=4 |
| TL=0 | PA5 | PA4 | PA3 | PA2 | PA1 | PA0 | VA | LEN=3 | PA0 | PA2 | PA1 | PA0 | VA | LEN=1 | PA4 |

FIG. 2

MEMORY MANAGEMENT DEVICE AND METHOD APPLIED TO INTELLIGENCE PROCESSING UNIT

This application claims the benefit of China application Serial No. CN202310116238.X, filed on Feb. 14, 2023, the subject matter of which is incorporated herein by reference.

BACKGROUND OF THE INVENTION

Field of the Invention

The resent application relates to a memory management method and device, and more particularly to a memory management device and method capable of improving memory management efficiency of an intelligence processing unit.

Description of the Related Art

Application scenarios of intelligence processing units are becoming more diversified along with the development of the artificial intelligence (AI) technology. In the prior art, an internal storage space of an intelligence processing unit can be increased to meet memory bandwidth access requirements needed in these scenarios for the intelligence processing unit. In the prior art, memory management of an intelligence processing unit may produce fragmented data access (usually involving multiple discontinuous physical addresses), or may need to completely search a buffer area in order to obtain physical addresses of a memory. As a result, memory management efficiency is degraded, further undesirably affecting instruction processing efficiency.

SUMMARY OF THE INVENTION

In some embodiments, it is an object of the present application to provide a memory management device and method so as to improve the drawbacks of the prior art.

In some embodiments, a memory management device applied to an intelligence processing unit includes a pre-fetch circuit, a setting circuit and a mapping circuit. The pre-fetch circuit acquires original data via a direct memory access (DMA) circuit, wherein the original data indicates a mapping relation between a first virtual address and multiple physical addresses of an external memory. The setting circuit analyzes the original data to sequentially map the physical addresses to multiple second virtual addresses including the first virtual address and issues a write request. The mapping circuit stores the mapping relation between the physical addresses and the second virtual addresses as a first mapping table according the write request, and utilizes the first mapping table according to at least one read request corresponding to at least one channel of the DMA circuit to access the memory.

In some embodiments, a memory management method includes operations of: acquiring original data via a direct access memory (DMA) circuit, wherein the original data indicates a mapping relation between a first virtual address and multiple physical addresses of an external memory; analyzing the original data to sequentially map the physical addresses to multiple second virtual addresses including the first virtual address and issuing a write request; and storing a mapping relation between the multiple physical addresses and the multiple second virtual address as a first mapping table according to the write request, and utilizing the first mapping table according to at least one write request corresponding to at least one channel of the DMA circuit to access the memory.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

FIG. 2 is a schematic diagram of the original data in FIG. 11 according to some embodiments of the present application;

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope or the meanings of the present application. Similarly, the present application is not limited to the embodiments enumerated in the description of the application.

The term "coupled" or "connected" used in the literature refers to two or multiple elements being directly and physically or electrically in contact with each other, or indirectly and physically or electrically in contact with each other, and may also refer to two or more elements operating or acting with each other. As given in the literature, the term "circuit" may be a device connected by at least one transistor and/or at least one active element by a predetermined means so as to process signals.

Figure 1:
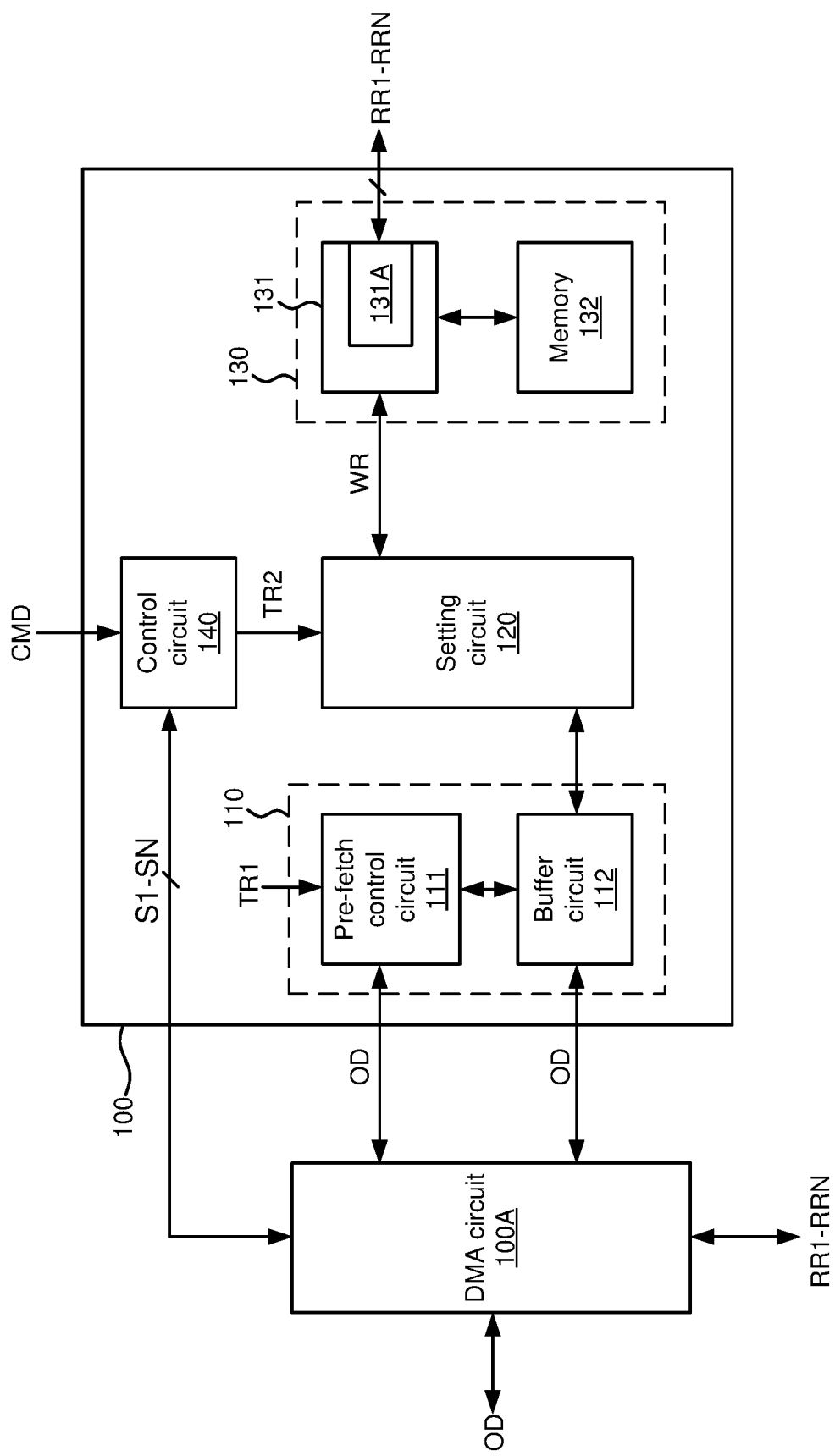
FIG. 1 is a schematic diagram of a memory management device according to some embodiments of the present application.

FIG. 1 shows a schematic diagram of a memory management device 100 according to some embodiments of the present application. In some embodiments, the memory management device 100 is applicable in an intelligence processing unit (IPU) to manage an internal memory of the intelligence processing unit, so as to improve the utilization efficiency of the internal memory.

The memory management device 100 includes a pre-fetch circuit 110, a setting circuit 120, mapping circuit 13 and a control circuit 140. The pre-fetch circuit 110 is coupled to a direct memory access (DMA) circuit 100A so as to access an external memory (for example but not limited to, a dynamic random access memory (DRAM)) and/or a cache memory in the intelligence processing unit. The pre-fetch circuit 110 can acquire original data OD via the DMA circuit 100A. In some embodiments, the original data OD may indicate a mapping relation between a first virtual address and multiple physical addresses in a memory (for example, the external memory or cache memory above). Configuration details of the original data OD are to be described later referring to FIG. 2.

In some embodiments, in an initial stage or when the memory management device 100 is initially activated, the pre-fetch circuit 110 may configure parameters (for example but not limited to, values of registers) in circuits in response to a trigger signal TR1 issued by a main processor (for example, a central processor) in a system. In subsequent operations, the main processor (and/or the control circuit 140) may issue the subsequent trigger signal TR1 according to a command CMD to be executed, so as to control the pre-fetch circuit 110 to acquire the corresponding original data OD via the DMA circuit 100A.

In some embodiments, the pre-fetch circuit 110 further determines whether a remaining data capacity in the pre-fetch circuit 110 is sufficient for storing a part of data of the original data OD so as to selectively store the part of the data, until the original data OD is completely stored. For example, the pre-fetch circuit 110 includes a pre-fetch control circuit 111 and a buffer circuit 112. The pre-fetch control circuit 111 is controlled by the trigger signal TR1, and sequentially reads multiple parts of data (which may form the original data OD) via the DMA circuit 100A. The pre-fetch control circuit 111 may determine whether the current remaining data capacity of the buffer circuit 112 is greater than or equal to the data amount of a part of data, so as to selectively control the buffer circuit 112 to store the part of data. For example, if the current remaining data capacity of the buffer circuit 112 is greater than or equal to the data amount of the part of data, the pre-fetch control circuit 111 may control the buffer circuit 112 to receive and store the part of data via the DMA circuit 100A. Similarly, the pre-fetch control circuit 111 may repeat the operation above, until the original data OD is completely stored (that is, pre-fetched) to the buffer circuit 112. In some embodiments, the DMA circuit 100A in the intelligence processing unit supports data transfer with multiple strides, multi-level lengths and memory alignment (byte alignment). Thus, during the process of pre-fetching the original data OD, the pre-fetch control circuit 111 may gradually transport these parts of data, wherein each of the parts of data may have a fixed length, for example but not limited to, 256 bytes.

The setting circuit 120 analyzes the original data OSD to sequentially map the physical addresses above to multiple second virtual addresses (including the first virtual address) and issues a write request WR. In some embodiments, the setting circuit 120 may be implemented by a decoder and a state machine to analyze the original data OD according to a data format of the original data OD, so as to obtain a mapping relation between the physical addresses and the second virtual addresses. Related operation details are to be described with reference to FIG. 3 below. Once the mapping relation is obtained, the setting circuit 120 may issue the write request WR to the mapping circuit 130 to store the mapping relation above as a mapping table. In some embodiments, the setting circuit 120 is controlled by a trigger signal TR2. The control circuit 140 may decode a command CMD originated from the main processor to generate the trigger signal TR2, so as to control the setting circuit 120 to analyze the original data OD and to update the mapping relation between the virtual addresses and the physical addresses.

The mapping circuit 130 stores the mapping relation between the physical addresses and the second virtual addresses to a first storage space in the mapping circuit 130 as a first mapping table according the write request WR, and utilizes the first mapping table according to one or more (at least one one) read requests RR1 to RRN from the DMA circuit 100A to access the external memory or the cache memory, wherein the read requests RR1 to RRN correspond to different channels of the DMA circuit 100A, respectively. For example, when a part of commands or operations in the command CMD from the main processor are performed by the intelligence processing unit, the intelligence processing unit may issue one or more read requests RR1 to RRN to the mapping circuit 130 via the DMA circuit 100A. The mapping circuit 130 may utilize the first mapping table on the basis of the one or more read requests RR1 to RRN (or another mapping table indicative of a mapping relation between other virtual addresses and other physical addresses) to acquire actual storage addresses (that is, physical addresses) of commands and/or data to be used from the external memory or the cache memory above, further acquire instructions and/or data to be used from the external memory or the cache memory.

In some embodiments, the mapping circuit 130 further temporarily stores the read requests RR1 to RRN and the write request WR, and performs an arbitration on the read requests RR1 to RRN and the write request WR to determine an order for accessing multiple storage spaces of the mapping circuit 130 for each of the read requests RR1 to RRN and the write request WR.

More specifically, the mapping circuit 130 includes an arbitration circuit 131 and a memory 132. The arbitration circuit 131 includes a buffer 131A, which temporarily stores the read requests RR1 to RRN and the write request WR. Thus, during the process of arbitration performed by the arbitration circuit 131, suspension of receiving the writing and/or reading requests caused by an overly large number of requests can be prevented. The arbitration circuit 131 may execute an arbitration algorithm to determine the orders for accessing the multiple storage spaces of the memory 132 for the write request WR and the read requests RR1 to RRN. In some embodiments, the arbitration algorithm may be, for example but not limited to, a round-Robin algorithm. The memory 132 includes multiple storage spaces, which may store multiple mapping tables, respectively. For example, the arbitration circuit 131 may store the mapping relation between the physical addresses and the second virtual addresses to the first storage space of the multiple storage spaces as a first mapping table in response to the write request WR.

By providing the arbitration circuit 131, the DMA circuit 100A and the setting circuit 120 can in parallel access multiple mapping tables in the mapping circuit 130, thus further achieving efficient memory management. For example, when the setting circuit 120 is to store the first mapping table to the first memory space (corresponding to the write request WR) of the memory 132 and the DMA circuit 110A is to read a mapping table (corresponding to the read request RR1) in a second storage space in the memory 131, because the memory spaces to be accessed by the two are different, the arbitration circuit 131 allows the setting circuit 120 and the DMA circuit 100A to simultaneously access the first and second storage spaces. In other words, in this case, a period in which the setting circuit 120 writes the first mapping table to the first memory space at least partially overlaps a period in which the DMA circuit 100A reads from the second storage space. Thus, the access efficiency of the memory 132 is enhanced, thereby improving memory management efficiency.

The control circuit 140 may decode the command CMD originated from the main processor, and determine dependency in the command CMD so as to set the multiple trigger signals TR2 and S1 to SN. The control circuit 140 may determine operation states of multiple storage spaces in the memory 132 according to multiple virtual register values (for example, multiple virtual register values EVR1 to EVR4 and EVR1' to EVR4' in FIG. 4B) corresponding to the multiple trigger signals TR2 and S1 to SN, so as to set output orders of the multiple triggers TR2 and S1 to SN. As described above, the trigger signal TR2 can trigger the setting circuit 120 to issue the write request WR, and the remaining multiple trigger signals S1 to SN can trigger the DMA circuit 100A to issue the read requests RR1 to RRN. The multiple trigger signals S1 to SN correspond to the read requests RR1 to RRN, respectively. For example, the trigger signal S1 can trigger the DMA circuit 100A to issue the write request RR1, and the trigger signal S2 can trigger the DMA circuit 100A to issue the read request RR2. Similarly, the correspondence between the multiple trigger signals S1 to SN and the multiple read signals RR1 to RRN can be understood accordingly. Operation details of the control circuit 140 are to be described with reference to FIG. 4A and FIG. 4B below.

FIG. 2 shows a schematic diagram of the original data OD in FIG. 1 according to some embodiments of the present application. As shown in FIG. 2, the original data OD includes multiple columns of data, each of which includes 16 pieces of information, and each piece of information may include 16 bits. In other words, one column of data has a length of 256 bits.

Taking the data from the first column to the third column for example, in an order from right to left and from top to bottom, the original data OD includes number information (denoted as TL=32), tag information (denoted as Tag), number information (denoted as LEN=4), information of a first virtual address (denoted as VA), information of multiple physical addresses (sequentially denoted as PA0 to PA3), number information (denoted as LEN=26), information of a first virtual address (denoted as VA), information of multiple physical addresses (sequentially denoted as PA0 to PA25), number information (denoted as LEN=1), information of a first virtual address (denoted as VA), information of a physical address (denoted as PA0), number information (denoted as LEN=1), information of a first virtual address (denoted as VA), information of a physical address (denoted as PA0) and multiple pieces of invalid information (denoted as TL=0). It should be noted that, the virtual address VA and the physical addresses PA0 to PA25 in different information fields may represent different addresses. The multiple pieces of invalid information is useless information in fragments, and may be used as padding data to implement bit alignment.

The number information TL=32 indicates that the number of all physical addresses to be set this time is 32; for example, among the data from the first column to the third column, there are a total of 32 pieces of information associated with physical addresses. The tag information Tag is for the setting circuit 120 to determine whether the original data OD has been correctly read. The number information LEN=4 indicates the number of increments of the virtual address VA (equivalent to the number of second virtual addresses). For example, the virtual address VA (equivalent to the first of the first virtual address or the second virtual addresses) may correspond to the physical address PA0 on the left, the virtual address VA+1 (equivalent to the second of the second virtual addresses) may correspond to the physical address PA1 on the left, and similarly the virtual address VA+3 may correspond to the physical address PA3. Similarly, the subsequent number information LEN=26 and virtual address VA may indicate that the virtual address VA corresponds to the physical address PA0, and the virtual address corresponds to the physical address PA25. Accordingly, it can be understood that the information above indicates the mapping relation between the multiple physical addresses and the multiple virtual addresses.

On the basis of the configuration above, multiple physical addresses can be compressed to correspond to one virtual address. For example, in the first column, the number information LEN=4 may correspond one virtual address VA to four physical addresses PA0 to PA3. In some embodiments, the original data OD may be generated in advance by an external system or main processor. For example, an external system and main processor may prepare the original data OD in advance on the basis of a related application scenario of a neural network executed by the intelligence processing unit (that is, the original data OD is generated offline). Thus, the data amount can be compressed for the DMA circuit 100A to use consecutive virtual addresses to further generate continuous commands so as to reduce the frequency of updating the mapping table.

Figure 3:
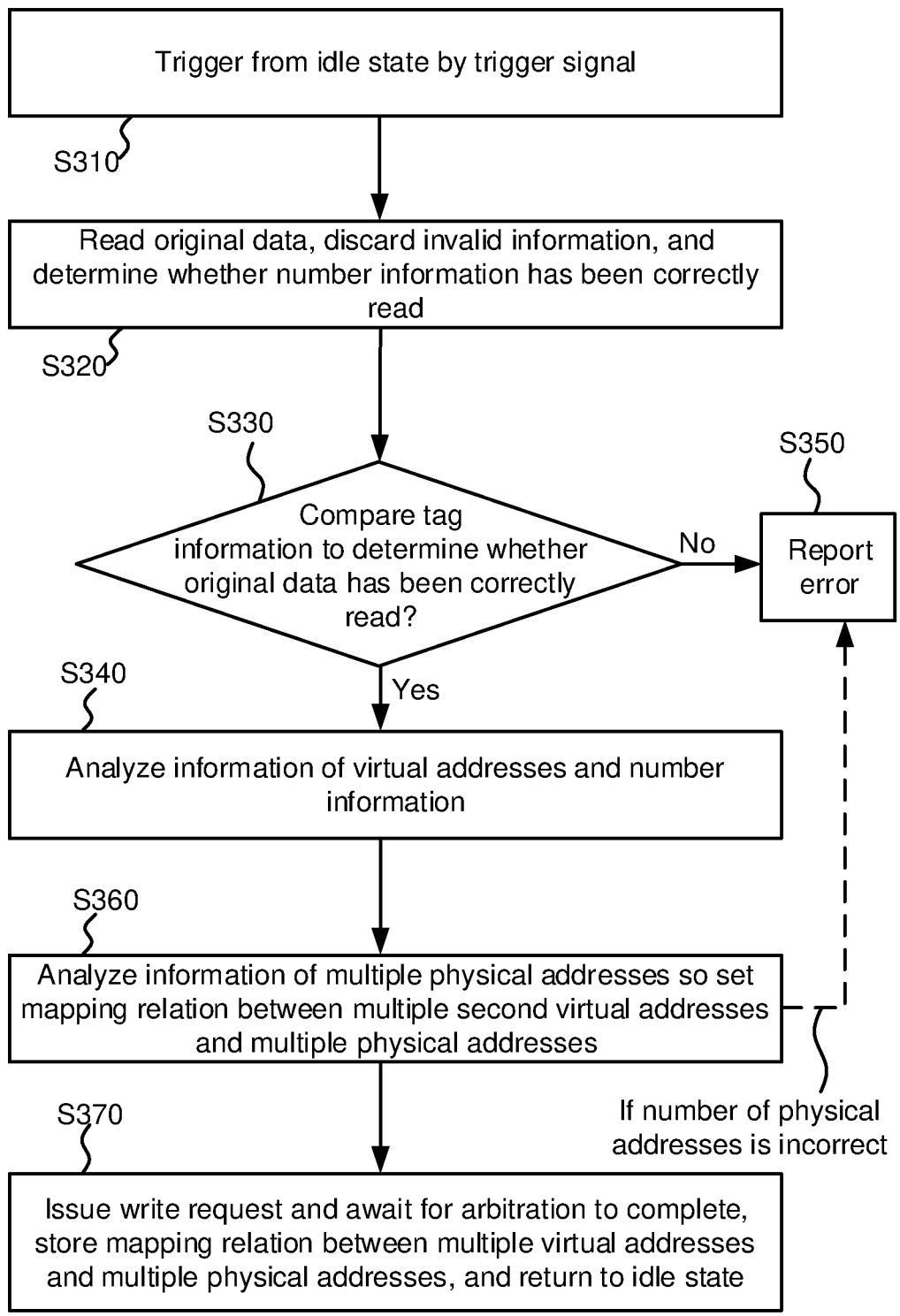
FIG. 3 is a flowchart of operations performed by the setting circuit in FIG. 11 according to some embodiments of the present application.

FIG. 3 shows a flowchart of operations performed by the setting circuit 120 in FIG. 1 according to some embodiments of the present application. In some embodiments, the multiple operations below may be used to implement operations of a state machine.

In operation S310, from an idle state, a next operation is triggered by a trigger signal (for example, the trigger signal TR2) to perform. In operation S320, original data is read, invalid data (for example, the invalid data TL=0 in FIG. 2) is discarded, and it is determined whether number information (for example, the number information TL=32) has been correctly read. If the number information has been correctly read, operation S330 is performed. In operation S330, tag information (for example, the tag information Tag) is compared to determine whether the correct original data has been correctly read. For example, when the control circuit 140 decodes the command CMD, the control circuit 140 may determine a tag of a mapping table to be used by an operation or instruction associated with the command CMD. The control circuit 140 may transmit information of this tag and the trigger signal TR2 to the setting circuit 120. The setting circuit 120 may compare this tag with the tag information Tag in the original data OD to determine whether the original data OD has been correctly read. If the original information OD has been correctly read, operation S340 is performed. If the original information OD has not been correctly read, operation S350 is performed to report an error.

In operation S340, information and number information (for example, the number information TL=32) of virtual addresses are analyzed. If the analysis is complete, operation S360 is performed to analyze information of multiple physical addresses so as to set a mapping relation between multiple second virtual addresses and the multiple physical addresses. For example, as described above, in the first column of data in FIG. 12, the mapping relation of the multiple physical addresses PA0 to PA3 associated with the number information LEN=4 is: the virtual address VA corresponds to the physical address PA0, the virtual address VA+1 corresponds to the physical address PA1, the virtual address VA+2 corresponds to the physical address PA2, and the virtual address VA+3 corresponds to the physical address PA3 on the left. In other words, with operation S340 and operation S360, the setting circuit 120 can restore the compressed mapping relation (that is, one virtual address corresponds to multiple physical addresses) in the original data OD to a mapping relation between multiple virtual addresses and multiple physical addresses. In operation S360, the number of physical addresses processed that is different from the value of the number information (for example, TL=32) indicates that the number of physical addresses is incorrect. In this case, operation S350 is performed to report an error, related data is cleared after reporting the error, and it is returned to an idle state. In operation S370, a write request is issued and it is awaited until the arbitration completes, the mapping relation between multiple second virtual addresses and multiple physical addresses is stored as a first mapping table, and it is returned to an idle state.

Figure 4A:
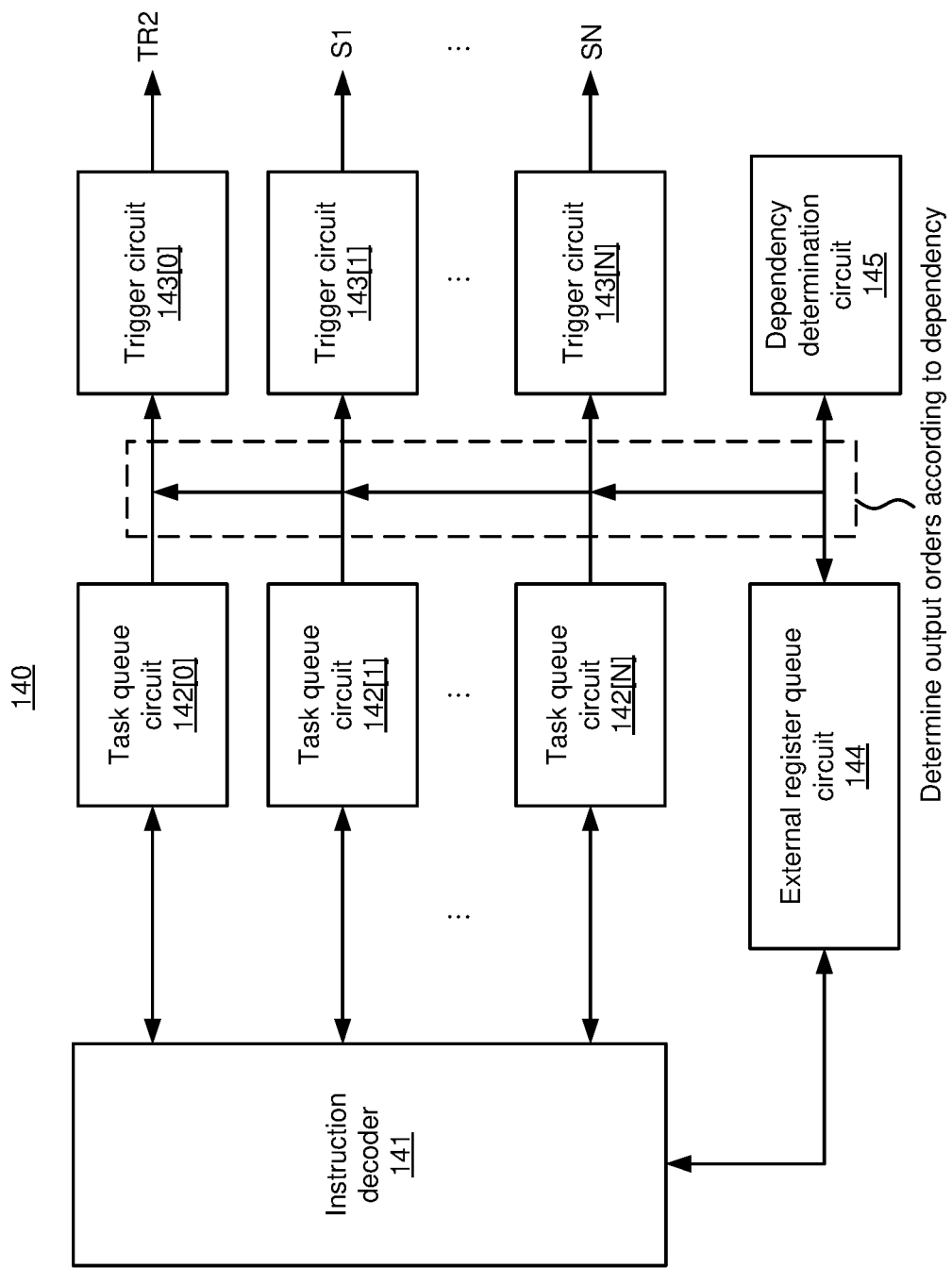
FIG. 4A is a schematic diagram of the control circuit in FIG. 11 according to some embodiments of the present application.

FIG. 4A shows a schematic diagram of the control circuit 140 in FIG. 1 according to some embodiments of the present application. The control circuit 140 includes an instruction decoder 141, multiple task queue circuits 142[0] to 142[N], multiple trigger circuits 143[0] to 143[N], an external virtual register queue circuit 144 and a dependency determination circuit 145.

Each of the multiple task queue circuits 142[0] to 142[N] may be, for example but not limited to, a first-in-first-out (FIFO) circuit, wherein the task queue circuit 142[0] stores tasks to be performed by the setting circuit 120, and the task queue circuits 142[1] to 142[N] store tasks to be performed by $1^{st}$ to $N^{th}$ channels of the DMA circuit 100A, respectively. The multiple trigger circuits 143[0] to 143[N] are provided to correspond to the multiple task queue circuits 142[0] to 142[N], respectively. For example, the trigger circuit 143[0] may generate the trigger signal TR2 according to a request issued by the task queue circuit 142[0]. The trigger circuit 143[1] may generate the trigger signal S1 to the DMA circuit 100A according to a request issued by the task queue circuit 142[1], for the $1^{st}$ channel of the DMA circuit 100A to issue the read request RR1. Similarly, the trigger circuit 143[N] may generate the trigger signal SN to the DMA circuit 100A according to a request issued by the task queue circuit 142[N], for the $N^{th}$ channel of the DMA circuit 100A to issue the read request RRN.

The instruction decoder 141 may decode the command CMD to determine instructions or data needed by the command CMD, and correspondingly transmit related tasks to the multiple task queue circuits 142[0] and 142[1] to 142[N]. For example, if the instruction or data required relates to a physical address recorded in a new mapping table, the instruction decoder 141 may send a task to the task queue circuit 142[0]. The trigger circuit 143[0] may accordingly generate a new write request WR to control the setting circuit 120 to replace the existing mapping table.

In order to ensure that the setting circuit 120 and the control circuit 140 can correctly and in parallel utilize multiple mapping tables stored in the mapping circuit 130, the external virtual register queue circuit 144 and the dependency determination circuit 145 may be used to determine operation states of multiple storage spaces in the mapping circuit 130, so as to set output orders via the multiple trigger signals TR2 and S1 to SN. The instruction decoder 141 may decode the command CMD and set multiple external virtual register values (for example, the multiple external virtual register values EVR1 to EVR4 and EVR1' to EVR4') in the external virtual register queue circuit 144 according to the dependency of the instructions and data needed by the command CMD, so as to record the operation states of the multiple storage spaces in the mapping circuit 130 (for example, whether currently being written by the setting circuit 120 or current being accessed by a channel of the DMA circuit 100A). The dependency determination circuit 145 may determine output orders of the multiple trigger signals TR2 and S1 to SN according to dependency of the instructions and data with one another and the multiple external virtual register values. According to the dependency of the instructions and data with one another, the dependency determination circuit 145 may set whether the multiple task queue circuits 142[0] to 142[N] can transmit requests to the multiple trigger circuits 143[0] to 143[N]. For example, the dependency determination circuit 145 may set the output orders of the multiple trigger signals TR2 and S1 to SN by means of interrupting connections between the multiple task queue circuits 142[0] to 142[N] and the multiple trigger circuits 143[0] to 143[N]. Related operation details are to be described with reference to FIG. 4B below.

Figure 4B:
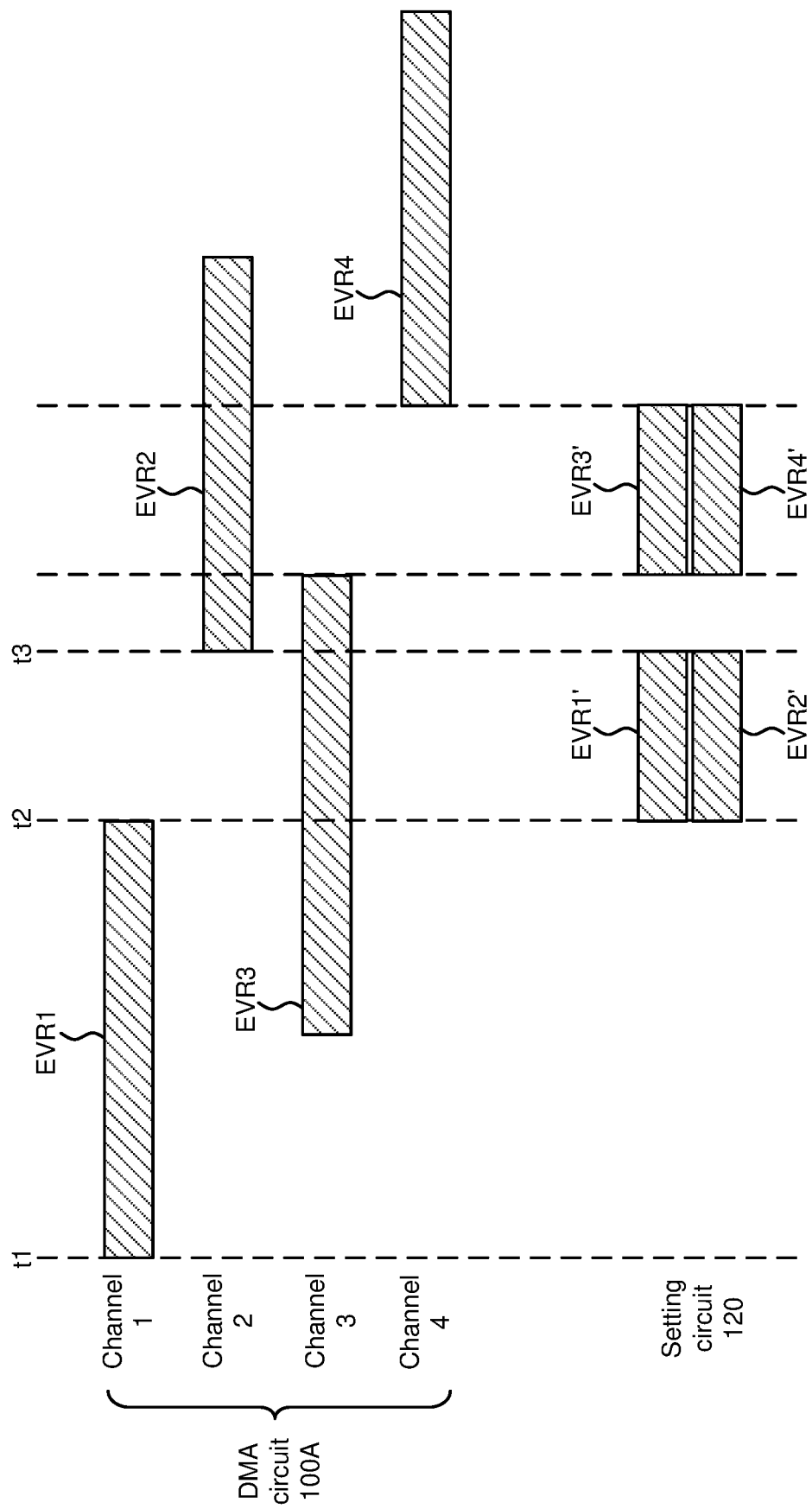
FIG. 4B is a schematic diagram of operation scheduling of the setting circuit and the DMA circuit in FIG. 11 accessing a memory according to some embodiments of the present application.

FIG. 4B shows a schematic diagram of operation scheduling of the setting circuit 120 and the DMA circuit 100A in FIG. 11 accessing a memory 132 according to some embodiments of the present application. In the example in FIG. 4B, the dependency determination circuit 145 may determine orders of the setting circuit 120 and the DMA circuit 100A for accessing the memory 132 according to the dependency of multiple instructions with each other. In some embodiments, the dependency determination circuit 145 may record in advance the dependency of multiple instructions and/or data with each other according to multiple related applications scenarios of the intelligence processing unit, so as to set the output orders of the multiple trigger signals TR2 and S1 to SN according to instructions included in the currently received command CMD.

For example, in some scenarios, a decoded command CMD includes multiple instructions corresponding to series of mathematical operations (for examples, image processing operations or convolution operations). For example, the first instruction may be a convolution operation, and the second instruction is to utilize a calculation result of the convolution operation for filter processing and then generate a next output. The dependency determination circuit 145 allows the DMA circuit 150 to first utilize multiple physical addresses indicated in a first mapping table of the memory 132 to access multiple instructions and/or data to be used by the convolution operation to perform a first-tier operation (for example, operations from a timing t1 to a timing t2). Next, the dependency determination circuit 145 allows the setting circuit 120 to replace the first mapping table of the memory 132 by a second mapping table (for example, with the operations between the timing t2 and a timing t3), and control the DMA circuit 100A to access, according to multiple physical addresses indicated by the second mapping table, multiple instructions and/or data to be used for filter processing to perform a second-tier operation (for example, an operation starting from the timing t3).

More specifically, at the timing t1, a channel 1 of the DMA circuit 100A is currently reading the first mapping table in the memory 132 so as to utilize the first mapping table to acquire physical addresses and to fetch instructions or data from the external memory or cache memory above to perform a convolution operation. Thus, the external virtual register value EVR1 (stored in the external virtual register queue circuit 144) corresponding to the channel 1 of the DMA circuit 100A switches to a predetermined value (represented by a shaded background) to indicate that the corresponding memory space storing the first mapping table in the memory 132 is in a busy state. At the timing t2, the channel 1 of the DMA circuit 100A finishes reading the first mapping table. The setting circuit 120 may clear the corresponding storage space and write the second mapping table to the corresponding storage space. Thus, the setting circuit 120 may switch the corresponding external virtual register values EVR1' and EVR2' (stored in the external virtual register queue circuit 144) to predetermined values to indicate that the corresponding memory space storing the second mapping table in the memory 132 is in a busy state. At the timing t3, the setting circuit 120 finishes replacing the second mapping table, and a channel 2 of the DMA circuit 100A is currently reading the second mapping table in the memory 132 so as to utilize the second mapping table to acquire physical addresses and to fetch instructions or data from the external memory or cache memory above to perform filter processing.

A channel 3 and a channel 4 of the DMA circuit 100A access the second mapping table stored in the second storage space in the memory 132, thereby acquiring the required instructions and/or data. Since the first storage space is different from the second storage space, the operating time of the channel 3 may partially overlap the operating time of the channel 1 and/or the time at which the setting circuit 120 writes to the first storage space. Similarly, the operating time of the channel 2 may partially overlap the operating time of the channel 3 or 4 and/or the time at which the setting time 120 writes to the second storage space (that is, the time at which the external virtual register values EVR3' and EVR4' are in a busy state).

Operation details between the channel 3 and channel 4 of the DMA circuit 100A and the setting circuit 120 are similar to those described above, and are omitted herein. It can be understood from the operations above that, the operation of replacing the mapping table by the setting circuit 120 does not affect the processing efficiency of the channel 3, and similarly, the operation of replacing the mapping table by the setting circuit 120 does not affect the processing efficiency of the channel 1. Accordingly, by providing multiple external virtual register values EVR1 to EVR4 and EVR1' to EVR4', the setting circuit 120 and the DMA circuit 100A are enabled to operate with better efficiency to in parallel access multiple storage spaces of the memory 132.

Figure 5:
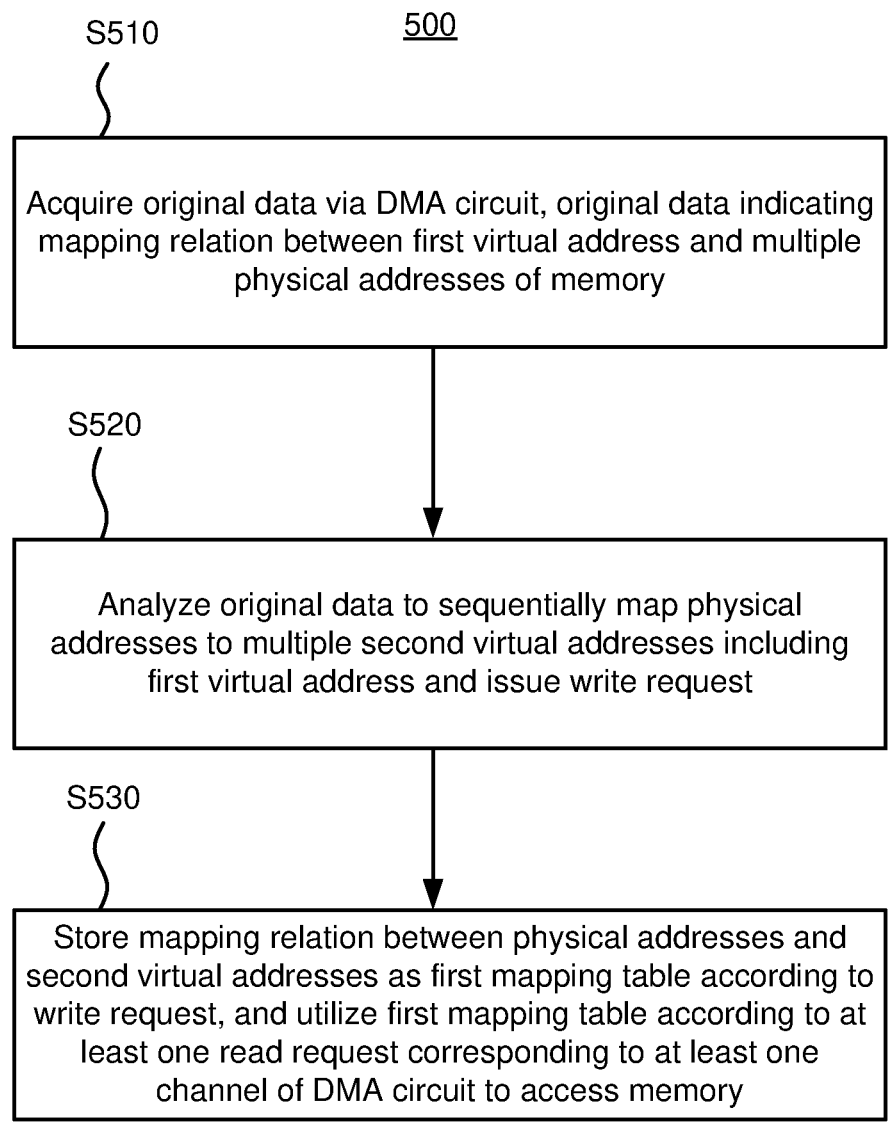
FIG. 5 is a flowchart of a memory management method according to some embodiments of the present application.

FIG. 5 shows a flowchart of a memory management method 500 according to some embodiments of the present application. In operation S510, original data is acquired via a DMA circuit, wherein the original data indicates a mapping relation between a first virtual address and multiple physical addresses of a memory. In operation S520, the original data is analyzed to sequentially map the physical addresses to multiple second virtual addresses including the first virtual address, and a write request is issued. In operation S530, a mapping relation between the physical addresses and the second virtual addresses is stored as a first mapping table according the write request, and the first mapping table is utilized according to at least one read request corresponding to at least one channel of the DMA circuit to access the memory.

The details of the multiple operations above may be referred from the description associated with the foregoing embodiments, and are omitted herein for brevity. The multiple operations of the memory management method 500 above are merely examples, and are not limited to being performed in the order specified in this example. Without departing from the operation means and ranges of the various embodiments of the present application, additions, replacements, substitutions or omissions may be made to the operations of the memory management method 500, or the operations may be performed in different orders (for example, simultaneously performed or partially simultaneously performed).

In conclusion, the memory management device and the memory management method according to some embodiments of the present application are capable of dynamically updating the mapping table in the intelligence processing unit, generating mapping relation data in an offline manner and perform parallel access to enhance memory management efficiency, thereby improving operating efficiency of the intelligence processing unit.

While the present application has been described by way of example and in terms of the preferred embodiments, it is to be understood that the disclosure is not limited thereto. Various modifications made be made to the technical features of the present application by a person skilled in the art on the basis of the explicit or implicit disclosures of the present application. The scope of the appended claims of the present application therefore should be accorded with the broadest interpretation so as to encompass all such modifications.

What is claimed is:

1. A memory management device, applied to an intelligent processing unit, the memory management device comprising:
   a pre-fetch circuit, acquiring original data via a direct memory access (DMA) circuit, wherein the original data indicates a mapping relation between a first virtual address and a plurality of physical addresses of a memory;
   a setting circuit, analyzing the original data to sequentially map the physical addresses to a plurality of second virtual addresses comprising the first virtual address and issuing a write request; and
   a mapping circuit, storing a mapping relation between the physical addresses and the second virtual addresses as a first mapping table according the write request, and utilizing the first mapping table according to at least one read request corresponding to at least one channel of the DMA circuit to access the memory.

2. The memory management device according to claim 1, wherein the pre-fetch circuit comprises:
   a buffer circuit; and
   a pre-fetch control circuit, determining whether a current remaining data capacity of the buffer circuit is greater than or equal to a data amount of a part of data of the original data, so as to selectively control the buffer circuit to store the part of data.

3. The memory management device according to claim 1, wherein the original data comprises first number information, second number information, tag information, information of the first virtual address and information of the physical addresses, wherein the first number information indicates the number of the physical addresses, and the second number information indicates the number of the second virtual addresses.

4. The memory management device according to claim 3, wherein the setting circuit determines, according to the first number information and the tag information, whether the original data has been correctly pre-fetched, and sequentially maps the physical addresses to the second virtual addresses according to the information of the first virtual address, the second number information and the information of the second virtual addresses.

5. The memory management device according to claim 4, wherein the setting circuit sequentially increments the first virtual address according to the information of the first virtual address and the second number information to generate the second virtual addresses.

6. The memory management device according to claim 1, wherein the mapping circuit further performs arbitration on the write request and the at least one read request to determine an order for accessing a storage space for storing the first mapping table for each of the write request and the at least one read request.

7. The memory management device according to claim 1, wherein when the mapping circuit is to store the first mapping table to a first storage space in the mapping circuit and the at least one read request is to read a second storage space in the mapping circuit, a period in which the first mapping table is stored to the first storage space at least partially overlaps a period in which the second storage space is read in response to the at least one read request.

8. The memory management device according to claim 1, wherein the mapping circuit comprises:
a memory, comprising a plurality of storage spaces; and
an arbitration circuit, temporarily storing the at least one read request and the write request, and determining orders for writing the write request and the at least one read request to the storage spaces;
wherein, the arbitration stores the first mapping table to a corresponding storage space of the storage spaces in response to the write request, so as to replace a second mapping table previously stored in the corresponding storage space.

9. The memory management device according to claim 1, further comprising:
a control circuit, decoding an instruction originated from a main processor and determining dependency of the instruction to set a plurality of trigger signals, and determining operation states of a plurality of storage spaces in the mapping circuit according to a plurality of external virtual register values respectively corresponding to the trigger signals so as to set output orders of the trigger signals,
wherein a first trigger signal in the trigger signals is for triggering the setting circuit to issue the write request, and the remaining trigger signals in the trigger signals are for triggering the DMA circuit to issue the at least one read request.

10. A memory management method, comprising:
acquiring original data via a direct memory access (DMA) circuit, wherein the original data indicates a mapping relation between a first virtual address and multiple physical addresses of an external memory;
analyzing the original data to sequentially map the physical addresses to a plurality of second virtual addresses comprising the first virtual address, and issuing a write request; and
storing a mapping relation between the physical addresses and the second virtual addresses as a first mapping table according the write request, and utilizing the first mapping table according to at least one read request corresponding to at least one channel of the DMA circuit to access the memory.

11. The memory management method according to claim 10, wherein the original data comprises first number information, second number information, tag information, information of the first virtual address and information of the physical addresses, wherein the first number information indicates the number of the physical addresses, and the second number information indicates the number of the second virtual addresses.

12. The memory management method according to claim 11, wherein the operation of analyzing the original data to sequentially map the physical addresses to a plurality of second virtual addresses comprising the first virtual address, and issuing a write request comprises:
determining, according to the first number information and the tag information, whether the original data has been correctly pre-fetched; and
sequentially mapping the physical addresses to the second virtual addresses according to the information of the first virtual address, the second number information and the information of the second virtual addresses.

* * * * *